(12) United States Patent
Costigan et al.

(10) Patent No.: US 9,305,260 B2
(45) Date of Patent: Apr. 5, 2016

(54) SYSTEM AND METHOD FOR DISTINGUISHING HUMAN SWIPE INPUT SEQUENCE BEHAVIOR

(71) Applicant: Behaviometrics AB, Lulea (SE)

(72) Inventors: Neil Costigan, Lulea (SE); Ingo Deutschmann, Merseburg (DE); Tony Libell, Lulea (SE); Johan Lindholm, Boden (SE); Peder Nordström, Lulea (SE); Peter Parnes, Parnes (SE)

(73) Assignee: Behaviometrics AB, Lulea (SE)

( * ) Notice: Subject to any disclaimer, the term of this patent is extended or adjusted under 35 U.S.C. 154(b) by 476 days.

(21) Appl. No.: 13/866,171

(22) Filed: Apr. 19, 2013

(65) Prior Publication Data

US 2013/0282637 A1    Oct. 24, 2013

Related U.S. Application Data

(60) Provisional application No. 61/637,572, filed on Apr. 24, 2012.

(51) Int. Cl.
```
G06F 21/31      (2013.01)
G06N 5/02       (2006.01)
G06F 3/0488     (2013.01)
G06F 21/32      (2013.01)
G06K 9/00       (2006.01)
```

(52) U.S. Cl.
CPC .......... G06N 5/022 (2013.01); G06F 3/04883 (2013.01); G06F 21/32 (2013.01); G06K 9/00355 (2013.01); G06F 2203/04105 (2013.01)

(58) Field of Classification Search
USPC ............... 726/19; 705/317; 382/119, 124
See application file for complete search history.

(56) References Cited

U.S. PATENT DOCUMENTS

| | | | | |
|---|---|---|---|---|
| 7,908,216 B1* | 3/2011 | Davis | ........... | G06Q 20/02 705/41 |
| 2003/0088645 A1* | 5/2003 | Ferraro | ........... | G06Q 10/10 709/218 |
| 2003/0179912 A1* | 9/2003 | Murase | ........... | G06K 9/00154 382/119 |
| 2004/0131237 A1* | 7/2004 | Machida | ........... | G06K 9/00899 382/124 |
| 2008/0091453 A1* | 4/2008 | Meehan | ........... | G06Q 20/341 705/317 |
| 2008/0129704 A1* | 6/2008 | Pryor | ........... | G06F 3/011 345/173 |
| 2009/0278792 A1* | 11/2009 | Toebes | ........... | G06F 21/83 345/156 |
| 2010/0115610 A1* | 5/2010 | Tredoux | ........... | H04L 9/3231 726/19 |
| 2010/0272609 A1* | 10/2010 | Haas | ........... | G01N 21/8483 422/82.05 |
| 2011/0304531 A1* | 12/2011 | Brooks | ........... | G06F 1/1626 345/156 |
| 2012/0246737 A1* | 9/2012 | Paxton | ........... | G06F 21/316 726/27 |
| 2012/0266220 A1* | 10/2012 | Brudnicki | ........... | G06F 21/629 726/6 |
| 2013/0076650 A1* | 3/2013 | Vik | ........... | G06F 3/041 345/173 |
| 2013/0282637 A1* | 10/2013 | Costigan | ........... | G06N 5/022 706/46 |
| 2014/0247251 A1* | 9/2014 | Zhang | ........... | G06F 3/0488 345/178 |

\* cited by examiner

*Primary Examiner* — Joseph P Hirl
*Assistant Examiner* — Sayed Beheshti Shirazi
(74) *Attorney, Agent, or Firm* — Michael J. Feigin, Esq.; Feigin & Fridman

(57) ABSTRACT

Recording, analyzing and categorizing of user interface input via touchpad, touch screens or any device that can synthesize gestures from touch and pressure into input events. Such as, but not limited to, smart phones, touch pads and tablets. Humans may generate the input. The analysis of data may include statistical profiling of individual users as well as groups of users, the profiles can be stored in, but not limited to data containers such as files, secure storage, smart cards, databases, off device, in the cloud etc. A profile may be built from user/users behavior categorized into quantified types of behavior and/or gestures. The profile might be stored anonymized. The analysis may take place in real time or as post processing. Profiles can be compared against each other by all the types of quantified behaviors or by a select few.

7 Claims, 7 Drawing Sheets

Collection of input points (measuring points)

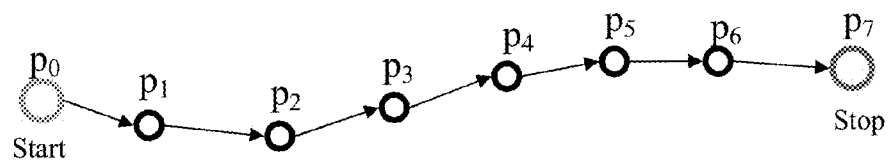
Figure 1 – Collection of input points (measuring points)
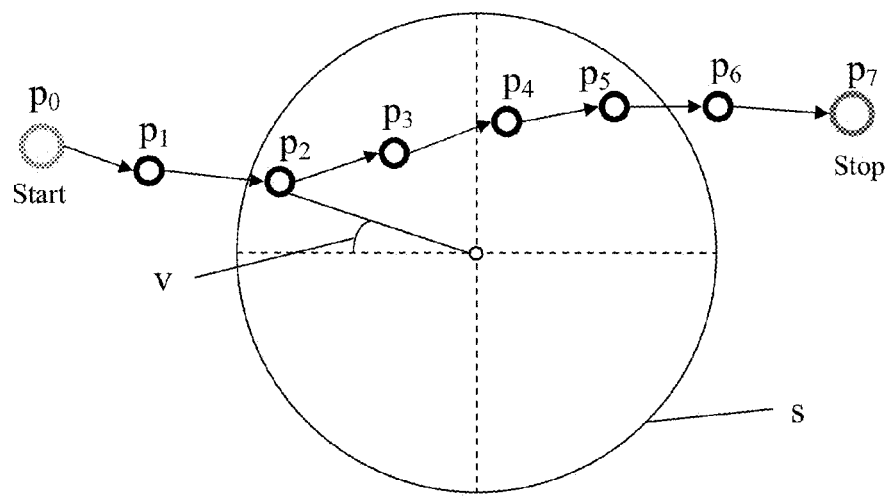
Figure 2 – Single measuring point

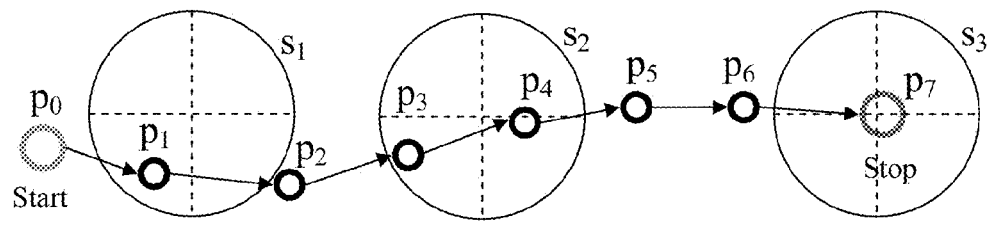
Figure 3 - Multiple measuring points
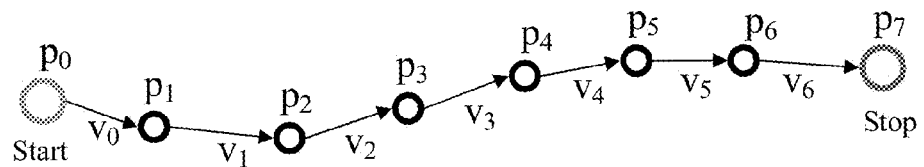
Figure 4 - Acceleration
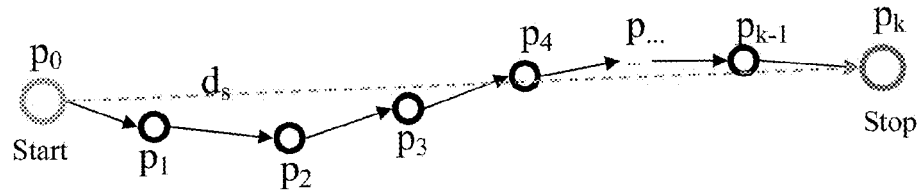
Figure 5 - Quotient

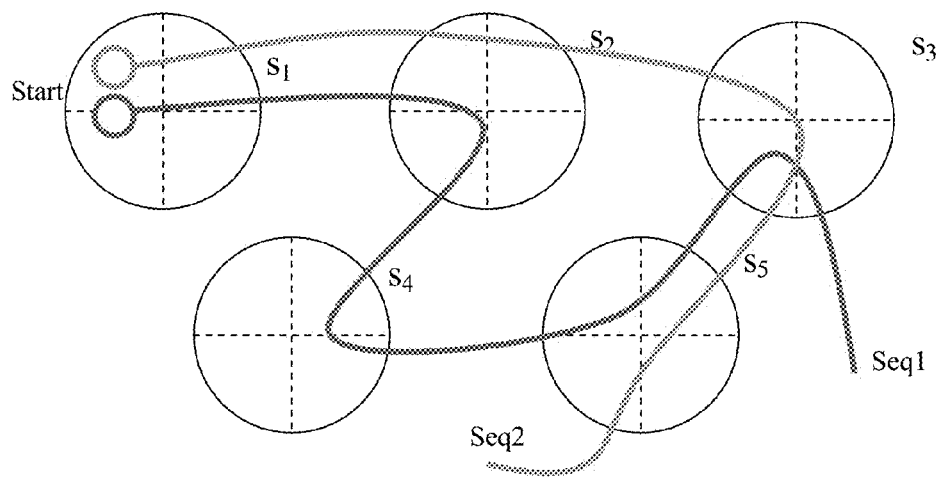
Figure 6 - Sequence
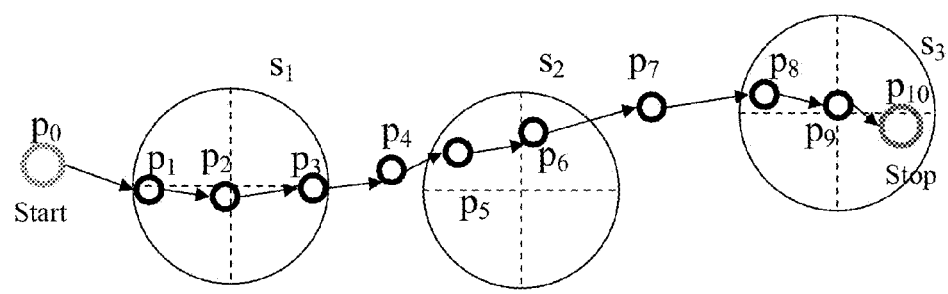
Figure 7 - Flight
Figure 8 - Dominant side

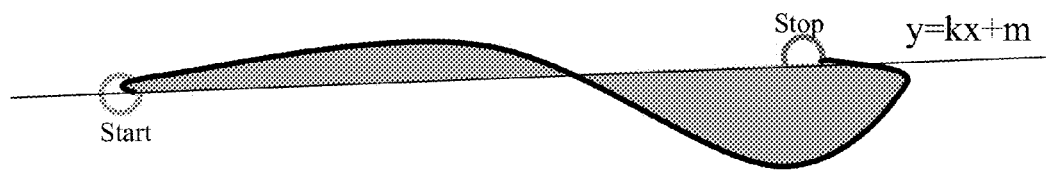
Figure 9 - Area
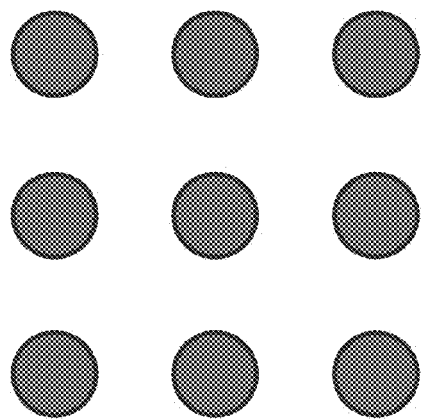
Figure 10 Collision Shapes

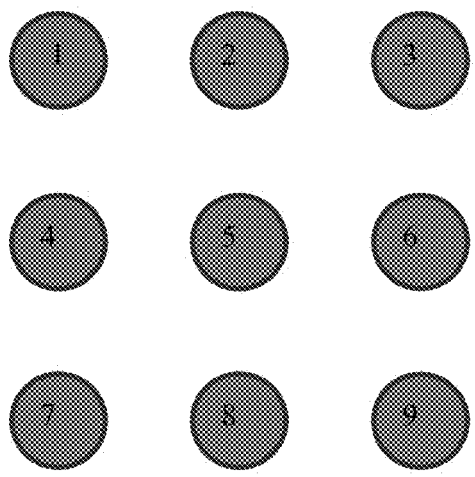
Figure 11 Collision Shapes resembling a PIN pad
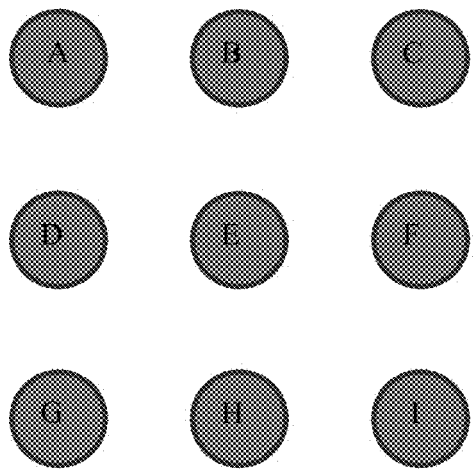
Figure 12 Collision Shapes resembling a letter pad

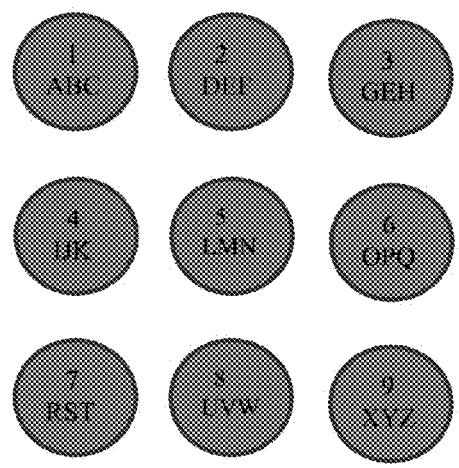
Figure 13 Collision Shapes resembling an alphanumeric key pad
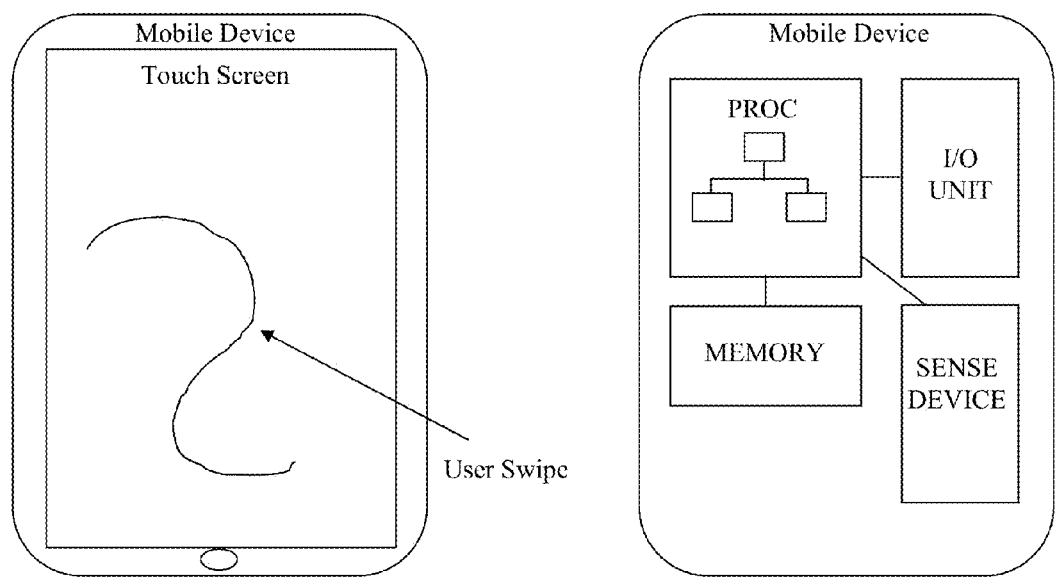
FIG. 14 Example System with Sensory Device on which Process Operates
FIG. 15 Example System with Sensory Device on which Process Operates

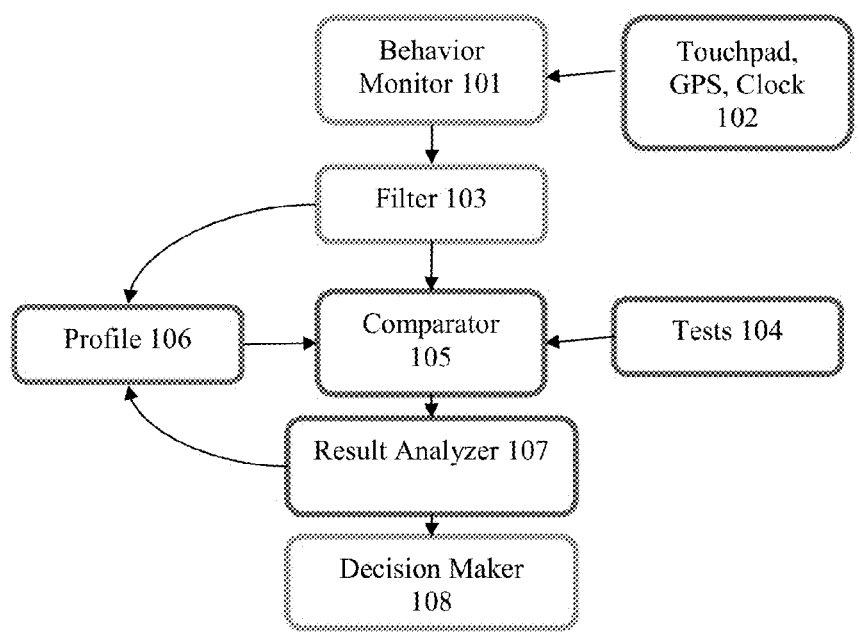
FIG 16 is shown a flow chart of a sample behvioral biometric system

SYSTEM AND METHOD FOR DISTINGUISHING HUMAN SWIPE INPUT SEQUENCE BEHAVIOR

FIELD OF THE DISCLOSED TECHNOLOGY

The present invention describes a method and system that uses behavioral biometric algorithms that gather, filter, analyze and distinguish human swipe input sequence behavior from other human behavior and or machine behavior.

BACKGROUND OF THE DISCLOSED TECHNOLOGY

Computing devices, such as mobile handsets, are traditionally designed to deliver performance on restricted hardware. Since there is no 'built-in security' commonly found on purpose built computers with increased mobility (e.g., smart phones), information stored in the computing devices is much more likely to end up in the wrong hands. Adding smart card readers or expecting users to carry One-Time-Password tokens (OTPs) to use with the computing devices is not realistic. Out-of-band solutions such as SMS or other communications protocols are cumbersome and not user friendly for widespread use. People pick weak passwords that are easy to remember or just easy to type on a handset and voice biometric solutions are expensive and disrupts the user experience. Multilayered security can be achieved by combining three pillars: (i) something you have (e.g., the phone as a token), (ii) something you know (e.g., your PIN), and (iii) something you are (e.g., your physical or behavioral metrics).

SUMMARY OF THE DISCLOSED TECHNOLOGY

The principles of the present invention provide for recording, analyzing, and categorizing user interface input via touchpad, touch screens or any electronic device that can receive and sense or synthesize gestures from human touch and pressure into input events. Such electronic devices may include, but are not limited to, smart phones, touch pads and tablets. Humans may generate the input sequence behavior that is converted by the electronic devices into sequence behavior input data.

The analysis of the sequence behavior input data may include statistical profiling of individual users as well as groups of users. The statistical profiles can be stored in, but are not limited to, data containers, such as files, secure storage, smart cards, databases, off device (e.g., memory devices), "cloud" storage devices, etc. A statistical profile may be built from user/users behavior categorized into quantified types of behavior and/or gestures. The analysis may take place in real time or non-real time, such as post-processing.

Statistical profiles can be compared against each other by one or more types of quantified behaviors. Quantified types of behavior may be, but not limited to, angle, acceleration, sequence, flight, pressure, quotient, and velocity.

BRIEF DESCRIPTION OF THE DRAWINGS

The accompanying drawings, which are incorporated into and constitute a part of the specification, illustrate one or more example embodiments of the invention and, together with the detailed description serve to explain their principles and implementations.

FIG. 1 is shown a collection of input points.
FIG. 2 is shown a single measuring point with a collision detection circle and input points.
FIG. 3 are shown multiple measuring points with collision detection circles and input points.
FIG. 4 is shown the acceleration of multiple points.
FIG. 5 is shown the quotient of two points or shapes.
FIG. 6 are shown two sequences with multiple shapes.
FIG. 7 is shown the flight behavior with multiple input points and three shapes.
FIG. 8 is shown the dominant side on the lower side of two points.
FIG. 9 is shown the area between two points of a sequence.
FIG. 10 are shown sample collision shapes.
FIG. 11 are shown collision shapes, resembling a PIN pad.
FIG. 12 are shown collision shapes, resembling a letter pad.
FIG. 13 are shown collision shapes, resembling an alphanumeric PIN pad.
FIG. 14 is shown an example system with a sensory device on which the behavioral biometric process operates.
FIG. 15 is shown an example system with a sensory device on which the behavioral biometric process operates.
FIG. 16 is shown a flow chart of a sample behavioral biometric system.

DETAILED DESCRIPTION OF EMBODIMENTS OF THE DISCLOSED TECHNOLOGY

Input from a touch, mouse, or other gesture sensory interface may be gathered in a raw format to be processed to determine different behavioral traits. The raw format may include points in space, such as a plane, with the highest resolution available for a particular system. Each point has one or more coordinate values (e.g., Cartesian coordinates), timing and any other information the system may provide, such as, but not limited to, pressure. Multiple points or a set of points are called an input sequence. An input sequence can be processed to different behaviors (sequence behavior), which might include the total aggregated distance, time or pressure, acceleration, angle and others. If an input sequence is touching or crossing shapes, which are visible on the touch screen it is called a shape input sequence (see FIGS. 2, 3, 4).

FIG. 1 shows an example collection of input points (input sequence) where each point has information of the touch or event, such as Cartesian coordinates (x, y), time (t) and pressure (pr). Additionally, a floating touch input, where the finger of the user is not leaving the touch screen could be used similar, to record the input points, and use the touch as an additional behavior. It should be understood that a wide variety of input devices that respond to touch and/or motion may be utilized in accordance with the principles of the present invention.

The raw input may be filtered by either excluding points, taking the average over two or more points to create new points, or performing another filtering technique. To eliminate errors, filtering may be applied to specific data of some points. To anonymize users, filters may also be applied to specific data of some points, or some points maybe omitted.

Two or more points may be used to generate and/or calculate behaviors, such as, but not limited to, the velocity between the points.

Geometric figures, points, lines, and polygons may be implemented as collision detection to be used to create additional behaviors. These figures, points, lines and polygons may also be movable to create additional behaviors.

FIG. 2 shows an example where the point p2 is inside a collision detection circle. The center of the circle s and the point p2 may be used to calculate a behavior angle v.

Two or more collision detection shapes may be used to generate and/or calculate behaviors such as, but not limited to, the velocity between the collision detection shapes. It should be understood that a geometric or non-geometric shape other than a circle may be utilized.

FIG. 3 displays how 3 circles s1, s2, s3 may be used for behavior analysis. s1 receives p1 properties while s2 receives the properties from both p3 and p4. If several points are inside a geometric shape, one of them or all of them may be used by taking the average of the points, for example. Any behavior applicable to raw points may also be applicable do a series of geometric shapes.

Examples of Quantified Tests/Behaviors/Behavioral Traits

Every test/behavior/behavioral trait may be calculated from any point or shape in a series of touch points or shapes to any other point or shape.

Angle Behavior

The angle value may be calculated from any point or shape in a series of touch points to any other point or shape. It could be, but not limited to, the first point inside a geometric shape, such as P2 in FIG. 2, or the last point inside a geometric shape, such as p5 in FIG. 2. These two examples would be the entering and exiting points to calculate the entering and exiting angle.

Velocity Behavior

Velocity v is the change in position respect to time. Velocity can be calculated by dividing the distance d between two points or shapes by the time:

$$d = \sqrt{(p_{x1} - p_{x0})^2 + (p_{y1} - p_{y0})^2}$$

$$v = \frac{d}{(t_1 - t_0)}$$

The distance and time may be aggregated for several points before the velocity is calculated to give an average velocity. The velocity may be divided into its components according to the coordinate system in use. For example, in the Cartesian coordinate system, the velocity of the x and y component would be.

$$d_x = p_{x1} - p_{x0}$$

$$v_x = \frac{d}{(t_1 - t_0)}$$

$$d_y = p_{y1} - p_{y0}$$

$$v_y = \frac{d}{(t_1 - t_0)}$$

Acceleration Behavior

FIG. 4 shows a series of touch points with velocity vectors shown between successive touch points. Acceleration is the rate of change of velocity of the touch input. The acceleration can be calculated by dividing the change in velocity between two points and the time ($t=t_2-t_0$.

$$a = \frac{(v_1 - v_0)}{(t_2 - t_0)}$$

Quotient Behavior $$d_s = \sqrt{(p_{xk} - p_{x0})^2 + (p_{yk} - p_{y0})^2}$$

$$d_a = \sum_{n=0}^{k-1} \sqrt{(p_{x(n+1)} - p_{xn})^2 + (p_{y(n+1)} - p_{yn})^2}$$

$$q = \frac{d_a}{d_s}$$

FIG. 5 shows a series of touch points that may be used to determine quotient behavior. The quotient behavior is the quotient q between the shortest distance ds and the aggregated distance da of two points or shapes.

Sequence Behavior

FIG. 6 shows a pair of touch input curves or sequences that are used to determine sequence behavior. The sequence behavior is the total aggregated distance, time or pressure for a touch input. A shape input sequence is the total aggregated distance, time or pressure for a touch input, that moves over two or more collision detection shapes (see FIGS. 1, 2, 3). The behavior is distinguished by which shapes are touched and is also directional, i.e. the s1 to s2 sequence is not the same as s2 to s1. Continuing with examples FIG. 6: Seq1 is the distance/time/pressure sequence when a touch input moves over the shapes s1→s2→s4→s5→s3, while seq2 is the sequence when the input moves over s1→s2→s3→s5. The total time, distance or pressure defines the sequence behavior. It is not limited to total time, distance or pressure, it could also be the mean or median etc.

A start sequence is beginning at the first touch until reaching the first shape. The end sequence is from leaving the last shape to the end of the touch.

Shapes/Collision Shapes

The shapes might resemble an empty PINPAD or, might be denoted by numbers or letters, so the user is able to remember also complex sequences.

Flight Behavior

FIG. 7 shows a series of touch points that may be created by a user interfacing with a touch pad or other sensory device to define a flight. Flight is a categorizing behavior that uses two or more shapes to categorize any other basic behavior, like pressure or velocity.

It categorizes behavior by how the input sequence enters and exits shapes. For example, the average velocity between the entering and exiting points of two shapes is shown in Table 1

TABLE 1

| Shape 1 | Shape 2 | Velocity |
|---|---|---|
| Enter | Enter | $v_0$ |
| Enter | Exit | $v_1$ |
| Exit | Enter | $v_2$ |
| Exit | Exit | $v_3$ |

TABLE 2

| Shape 1 | Shape 2 | Shape 3 | Time |
|---|---|---|---|
| Enter | Enter | Enter | $t_0$ |
| Enter | Exit | Enter | $t_1$ |

TABLE 2-continued

| Shape 1 | Shape 2 | Shape 3 | Time |
|---------|---------|---------|------|
| Exit | Enter | Exit | $t_2$ |
| Exit | Exit | Exit | $t_3$ |
| ... | ... | ... | ... |

As shown in FIG. 7, p1, p5, and p8 are entering points while p3, p6 and p10 are exiting points. The behavior between points p1 and p5 would be the enter/enter behavior for the shapes s1 and s2. While the behavior between the points p3 and p8 would be the exit/enter behavior for shapes s1 and s3. The behavior between the points p1, p5 and p10 would denote a enter/enter/exit categorization. The behavior categories for the sample FIG. 7 are shown in Table 2. The flight behavior could be, but not limited to, the average pressure, velocity, time or distance between the shapes in the sequence.

Dominant Side Behavior

FIG. 8 shows a touch sequence to illustrate a dominant side. The dominant side behavior checks weather the touch sequence is on one or the others side of the shortest distance between two shapes or points. As shown, the dominant side is to the lower side of the shortest distance between the two points.

Area Behavior

FIG. 9 is an illustration showing a touch sequence that includes two regions that define a certain area. The area behavior is the total area between the actual touch sequence and the shortest distance between two shapes or points. It is described by the enclosing curve. The area might be calculated using an integral over the enclosing curve.

Curve Fitting Behavior

Fit a Bezier curve to the actual input sequence and use the Bezier constants as behavior.

Height/Heat Map Behavior

Add a two-dimensional integer array or map using defined dimensions.

The size of the integer array can respond to the resolution of the touch screen or might be adjusted by a factor to make different resolutions comparable.

Each time a measuring point is activated the hit count for that particular point is increased. An algorithm for image recognition can be used to compare the maps. The heat map might also be split into sections, by putting a grid over the area.

Time/Local Time

The local time of the user can be recorded. An algorithm for calculating the probability of the sleeping time can be used as understood in the art. Example System Description FIG. 16 is shown a flow chart of a sample behavioral biometric system. A typical usage of the system might happen in the following way: At first the system is just recording the behavior of the user with the behavior monitor 101, using the input sequences and shape sequences, which are generated in the normal process of using the touchpad of the device 102 and might also use data from the GPS and Clock. Additional behavior might be gathered by displaying collision shapes on the touchscreen of the mobile device. The gathered data might be filtered using the filter 103. A user profile 106 will be generated and stored.

Authentication of a User

The behavior monitor 101 gathers data from touchpad as well as system information such as GPS location and Clock data 102. This data is filtered using the filter 103 to be used for the quantified tests 104 in the comparator 105; the profile 106 for the user is loaded into the comparator 105. The result analyzer 107 decides if the profile should be updated with new input data depending on the result of the comparator 105, which is comparing the profile 106 with the gathered user data. The decision maker 108 decides if it was the correct user or not, or is delivering a raw score and a status mode (gathering or not gathering of user information) of the system. All these components may be installed on the system or distributed. The comparator 105, the profile 106, the result analyzer 107 and the decision maker 108 can be installed on the mobile device or on a central server or in a cloud environment. The decision maker 108 can be installed and run by a third party.

To protect the privacy of the user a mechanism to start and stop the behavior monitor 101 from gathering the behavior of the user might be provided. This mechanism might be operated by an administrator of the device or by the user himself. The information about the status of the behavior monitor 101 gathering/not gathering is communicated to the decision maker 108. Depending on the status of the behavior monitor 101 the decision maker 108 will deliver a gathering status.

The filter can also be used to anonymize the behavior of users, by omitting data of specific points or omitting specific points. The behavior monitor is able to run continuously, so that the system might get a constant data feed.

FIG. 14 is an illustration of an illustrative mobile device with a touch screen device enabling a user to swipe, creating an input sequence. FIG. 15 is a block diagram of the mobile device of FIG. 10 showing internal electronic components, including a processing unit, memory, input/output unit, and sense device (e.g., touch screen). The memory unit shown, includes software that may be executed by the processing unit to distinguish swipe input sequence behavior as described here. The processing unit, in response to a user performing a swipe, may execute the software to perform calculations, as previously described, to determine whether the user is the user to which the mobile device belongs. In one embodiment, the memory may store behavioral data that is associated with one or more swipes that the user has previously made during a registration process of the mobile device or during previous use of the mobile device. It should be understood that the drawings of the mobile device are illustrative and that additional and/or different components may be utilized in supporting and performing the processes described herein.

The previous description is of a preferred embodiment for implementing the invention, and the scope of the invention should not necessarily be limited by this description. The scope of the present invention is instead defined by the following claims.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

What is claimed is:

1. A method of using behavioral biometric algorithms implemented on a computer to authenticate user operation comprising:
   a. using a pinpad entry device identifying behavioral traits based on at least three of the following:
      i. an angle of the swipe when entering or leaving one or more measuring points,
      ii. a velocity between one more measuring points,
      iii. an acceleration between one or more measuring points,
      iv. a quotient between one or more measuring points,
      v. a sequence between multiple measuring points,
      vi. a start sequence to a first measuring point,
      vii. an end sequence from last measuring point,
      viii. a flight between one or more measuring points, the dominant side between one or more measuring points,
      ix dominant side between one or more measuring points,
      x. an area between one or more measuring points,
      xi. a curve fitting between one or more measuring points,
      xii. a heat map between one or more measuring points;
      xii. the average time of the sample,
      xiii. keypress timings; and
   b. filtering the selected behavioral traits based on at least one of the following:
      i. raw data in the highest resolution available for the particular system,
      ii. raw data in the resolution determined by the current application,
      iii. filtered data fitting different behavior traits;
   c. determining shape input sequence from the filtered behavior traits wherein the shape input sequence is the total aggregated distance, time or pressure for a touch input that moves over two or more collision detection shapes and behavior is distinguished by shape contact and direction
   d. analyzing the shape input sequence with user profiles to establish at least one of the following:
      i. determining if said input sequence is deemed from the same user,
      ii. determining if said input sequence is deemed from another user,
      iii. determining if said input sequence is deemed not human.

2. The method of claim 1, wherein said shape input sequence is inputted using a mouse.

3. The method of claim 1, wherein a raw score of a determination of human characteristics of said swipe input sequence is exhibited, lacking a determination as to whether said swipe input sequence was carried out by a human.

4. The method of claim 1, wherein collision detection on shapes is used to conduct analysis and distinguish human swipe shape input sequence and behavioral traits from other human behavior and or machine behavior.

5. The method of claim 1, wherein said shape input sequence comprises a determination of a shape of inputted data based on a shape of at least two letters or numbers.

6. The method of claim 1, wherein said method is carried out as part of post-processing, after a transaction by a user conducting said swipe input sequence is carried out.

7. The method of claim 1, wherein a filter is used to omit a part of said input sequence data to anonymize user information.

* * * * *